Jan. 10, 1950　　　R. E. RESTALL　　　2,494,144
WHEEL SUSPENSION FOR TRAILER BOATS
Filed Dec. 7, 1945　　　　　2 Sheets-Sheet 1

Inventor
Robert E. Restall

By Clarence A. O'Brien
and Harvey B. Jacobson
Attorneys

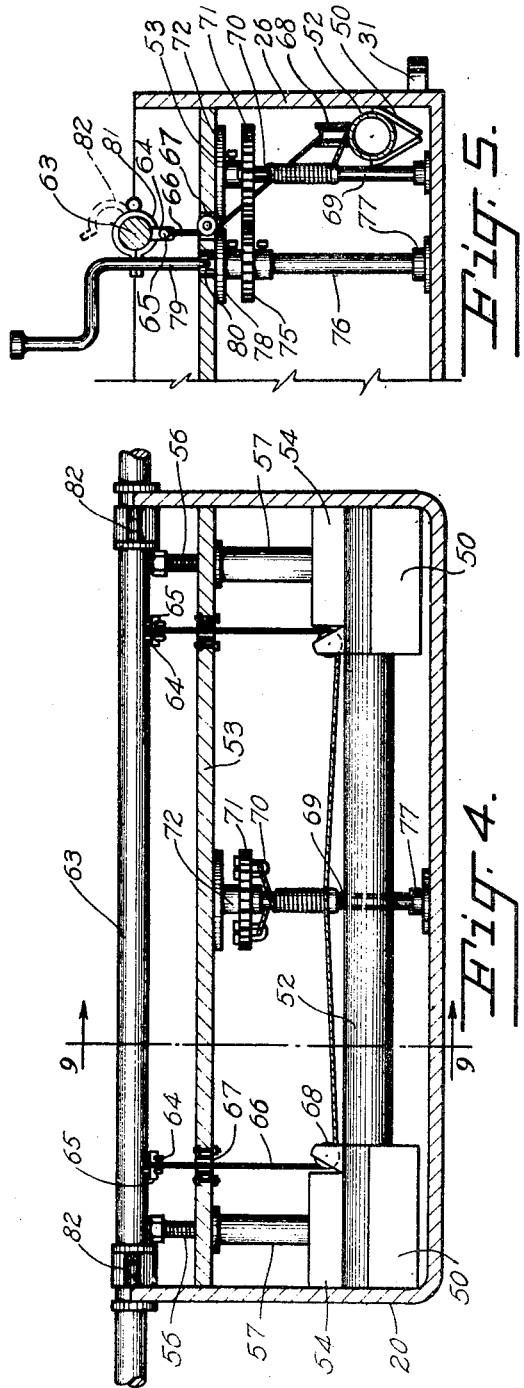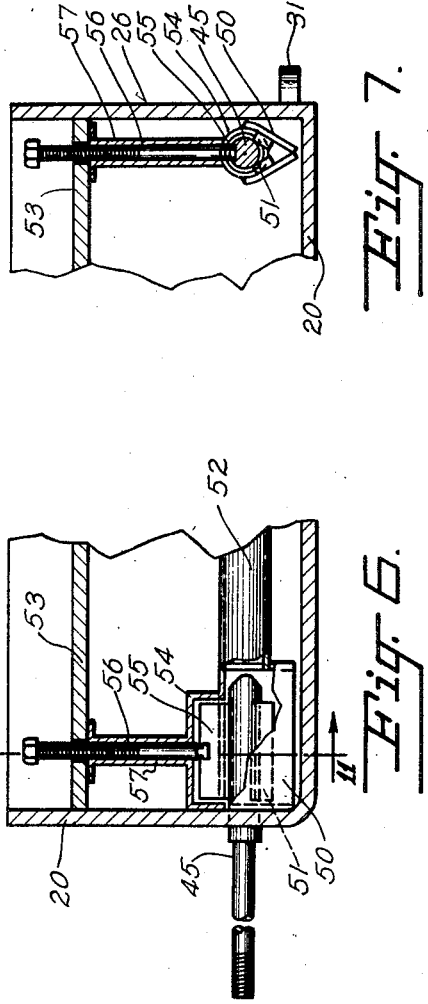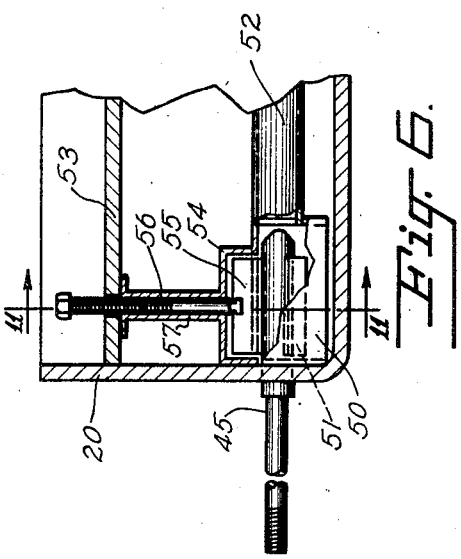

Patented Jan. 10, 1950

2,494,144

UNITED STATES PATENT OFFICE 2,494,144

WHEEL SUSPENSION FOR TRAILER BOATS

Robert E. Restall, Hamilton, Ontario, Canada

Application December 7, 1945, Serial No. 633,438

5 Claims. (Cl. 280—124)

This invention relates to a wheel suspension for a trailer boat, and more particularly to such a boat adapted to be folded, mounted on wheels, and towed by a vehicle.

A primary object of this invention is the provision of an improved trailer boat adapted to be readily folded, and provided with removable wheels whereby the same may be towed behind a vehicle.

An additional object of the invention is the provision of an improved wheel suspension for such a boat, characterized by springs so mounted as to relieve and obviate jolting of the boat.

A still further object of the invention is the provision of an improved mounting means for such wheels, whereby the springs associated therewith may be readily tensioned to provide maximum efficiency.

A still further object of the invention is the provision of such a device characterized by means for mounting stub axles of the wheels in fluid tight relation in the body of the boat.

Still another object of the invention is the provision of such a device whereby all associated mechanisms may be manipulated by a single tool.

A still further object of the invention is the provision of such a boat which will be sturdy and durable in construction, reliable and efficient in operation, and relatively simple to assemble and disassemble for towing as desired.

Other objects reside in the combinations of elements, arrangements of parts, features of construction, all as will be more fully pointed out hereinafter and shown in the accompanying drawing wherein there is disclosed a preferred embodiment of this inventive concept.

In the drawings:

Figure 4 is a sectional view taken substantially along the line 8—8 of Figure 2, as viewed in the direction indicated by the arrows.

Figure 5 is a sectional view taken substantially along line 9—9 of Figure 4, as viewed in the direction indicated by the arrows, certain additional portions of the mechanism being disclosed.

Figure 6 is a sectional view taken substantially along the line 10—10 of Figure 2, as viewed in the direction indicated by the arrows.

Figure 7 is a sectional view taken substantially along the line 11—11 of Figure 6, Similar reference characters refer to similar parts throughout the several views of the drawings.

Figure 1:
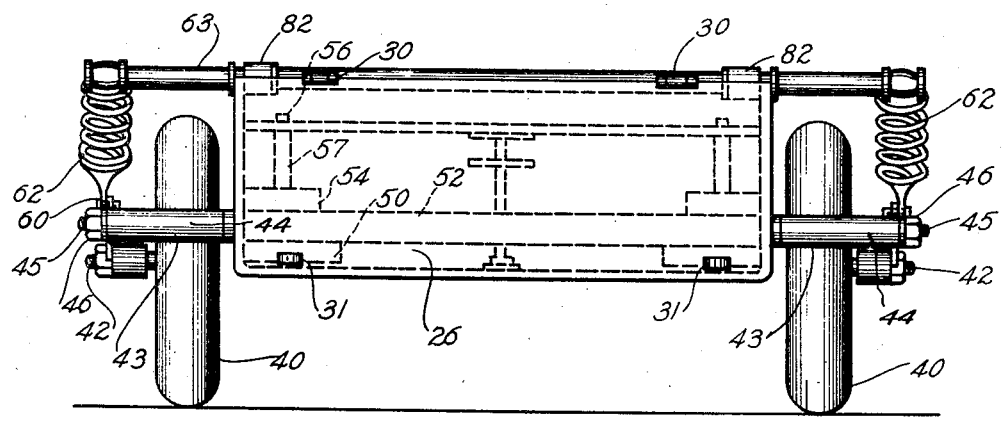
Figure 1 is a rear elevational view of a boat mounted on a towing wheel assembly which forms the subject of this invention.
Figure 2:
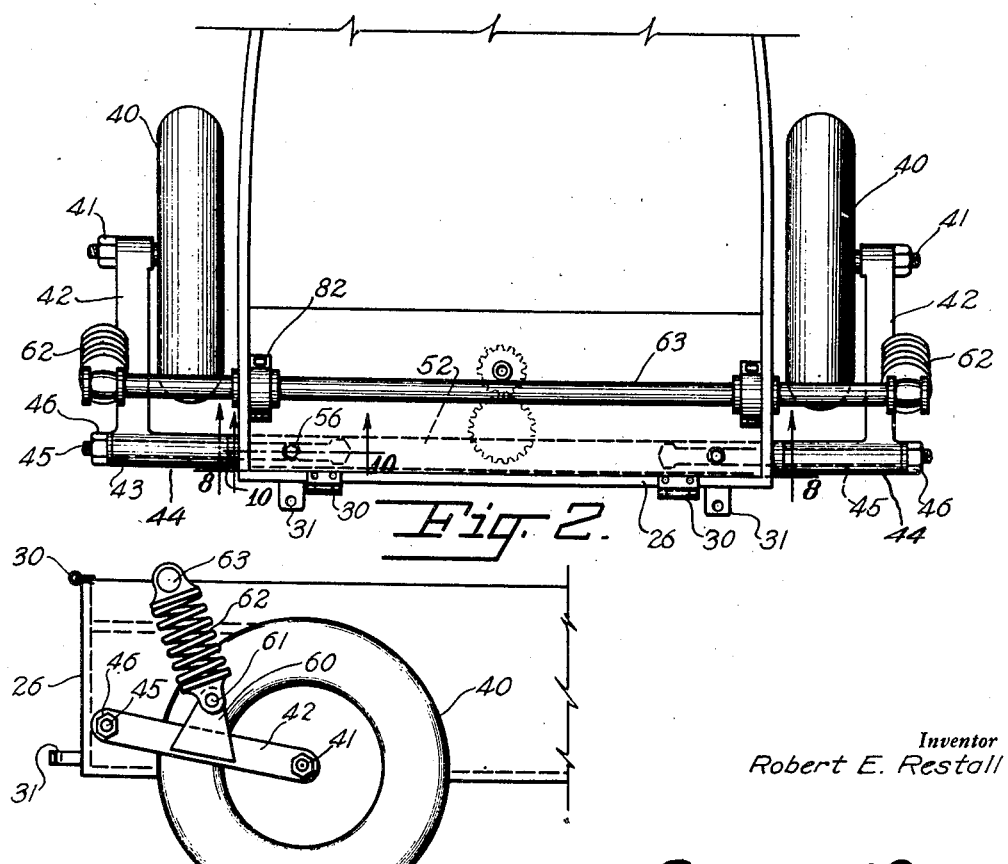
Figure 2 is a fragmentary top plan view of the mechanism shown in Figure 1, certain concealed portions thereof being indicated in dotted lines.

Having reference more particularly to the drawings, the boat of the instant invention is comprised of a hull, a portion of which is indicated at 20 which is closed at its rearmost portion by a bulkhead or partition 26.

Wheels 40 are provided on which the boat may be mounted for towing, the wheels 40 being mounted on stub axles 41, journalled for rotation in arms 42 of L-shaped members 43, the arms 44 of which are provided with bores which are journalled for rotation on axles 45, being secured in position as by nuts 46.

As best shown in Figures 6 and 7 the ends of the stub shafts or axles 45 are positioned in fluid-tight recesses within the sides of section 20, the recesses comprising V-shaped members 50 containing fixed jaws 51, the recesses 50 being secured to a sealed tubular shaft 52 extending transversely of the section 20 beneath the seat 53 thereof. The upper portion of the V-shaped recess 50 is closed by a semi-circular plate 54, within which is positioned a movable jaw 55, movable by a threaded bolt 56 extending through a sealed shaft 57 upwardly through the seat 53. It will thus be seen that the end of the axle 45 may be suitably positioned between the movable jaw 55 and the fixed jaw 51 and clamped in a desired position when a suitable degree of adjustment is reached, in a manner to be more fully described hereinafter. It will also be seen that there is herein provided a sealed fluid-tight axle housing, which obviates the necessity for the provision of gaskets or sealing means or the like.

The arms 42 are provided with clevis plates 60 to which are secured as by clevis pins 61 one end of compression spring, 62, the opposite ends of which are secured to a spring bar 63.

The bar 63 is provided integrally with hooks 64, adapted to be engaged by pins 65 spliced in the ends of wire ropes 66 which extend through suitable apertures 67 in the seat 53 about pulleys 68 and are wound about a shaft 69, and secured in eye bolts 70 in the lower face of a gear 71 carried by the shaft 69. The shaft 69 is journalled for rotation in a journal member 72. The gear 71 is adapted to be engaged by a reduction gear 75, mounted on a shaft 76 journalled as at 77 in the bottom of the section 20, and passing through a journal 78 secured to the underside of the seat 53. The top of the shaft is provided with a socket adapted to be engaged by a crank member 79, provided with a transverse pin 80 engaging in suitable radial slots in the socket to rotate the shaft 76.

Figure 3:
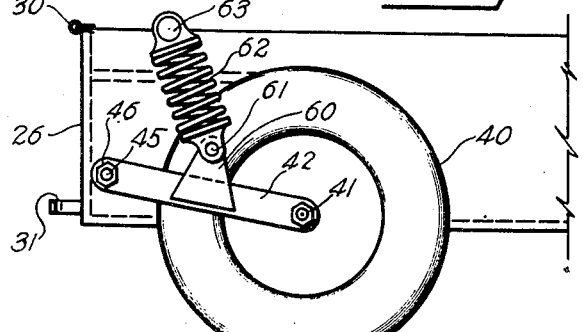
Figure 3 is a side elevational view of the portion of the mechanism shown in Figures 1 and 2.

From the foregoing it will now be seen that when it is desired to mount the wheels on the trailer boat, and tension the same, it being assumed that the boat is resting on the ground or the like, the axles 45 are first inserted in openings in the side of the boat and the spring bar positioned across the sides of the front section 20, and the springs 62 secured to the clevis plates 60. The spring bar is then moved forwardly, until the wheels rest on the ground, and the tool 79 is inserted in the socket 78, the pin 65 being engaged with the hook 64. Rotation of the tool 79 will now rotate the shaft 76, and through the gears 75 and 71 tighten the ropes 66 about the shaft 69. This tightening movement will move the spring bar 63 forwardly until it seats in a socket 81, provided with a hinged clamping member 82. It may here be pointed out that the bolts 56 are tightened to clamp the axles 45 in their associated jaws prior to the rotation of the shaft 76, and the subsequent movement of the wheels is effected by movement of the legs 43 of the members 42 about the axles 45. It will be seen that when the spring bar 63 is seated in the recesses 81, the clamping members 82 may be closed and locked as by screws or the like, and that at such time the device will be mounted in the position shown in Figure 3 with the wheels raising the trailer off the ground, and the springs 62 under compression.

Obviously, when it is desired to remove the wheels the wires 66 may be loosened by a reverse rotation to the shaft 76, to release the compression on the springs, whereupon the bolts 56 may be loosened and the wheels and spring bar removed from the boat.

From the foregoing it will now be seen that there is herein provided an improved boat trailer, accomplishing all the objects of this invention and others, including many advantages of great practical utility and commercial importance.

I claim:

1. In a wheel mounting for a boat trailer, sockets in said trailer, axles positionable in said sockets, means for clamping said axles in said sockets, L-shaped brackets rotatable on said axles, stub axles secured to said brackets, wheels mounted on said stub axles, and springs secured between said brackets and said boat trailer, a spring bar extending across said trailer, said springs being secured to said spring bar.

2. In a wheel mounting for a boat trailer, sockets in said trailer, axles positionable in said sockets, means for clamping said axles in said sockets, L-shaped brackets rotatable on said axles, stub axles secured to said brackets, wheels mounted on said stub axles, and springs secured between said brackets and said boat trailer, a spring bar extending across said boat trailer and seated in sockets therein, said springs being secured to said spring bar.

3. In a wheel mounting for a boat trailer, sockets in said trailer, axles positionable in said sockets, means for clamping said axles in said sockets, L-shaped brackets rotatable on said axles, stub axles secured to said brackets, wheels mounted on said stub axles, springs secured between said brackets and said boat trailer, a spring bar extending across said boat trailer, and seated in sockets therein, said springs being secured to said spring bar and means for seating said bar in said sockets and tensioning said springs.

4. In a wheel mounting for a boat trailer, sockets in said trailer, axles positionable in said sockets, means for clamping said axles in said sockets, L-shaped brackets rotatable on said axles, stub axles secured to said brackets, wheels mounted on said stub axles, springs secured between said brackets and said boat trailer, a spring bar extending across said boat trailer, and seated in sockets therein, said springs being secured to said spring bar, and means for seating said bar in said sockets and tensioning said springs, said means including wires secured to said bars, and means for tightening said wires.

5. In a wheel mounting for a boat trailer, sockets in said trailer, axles positionable in said sockets, means for clamping said axles in said sockets, L-shaped brackets rotatable on said axles, stub axles secured to said brackets, wheels mounted on said stub axles, springs secured between said brackets and said boat trailer, a spring bar extending across said boat trailer, and seated in sockets therein, said springs being secured to said spring bar and means for seating said bar in said sockets and tensioning said springs, said means including wires secured to said bars and means for tightening said wires, said last-mentioned means including a shaft journalled in said boat trailer about which ends of said wire are secured, and means for rotating said shaft.

ROBERT E. RESTALL.

REFERENCES CITED

The following references are of record in the file of this patent:

UNITED STATES PATENTS

| Number | Name | Date |
| --- | --- | --- |
| 1,376,496 | Woodruff | May 3, 1921 |
| 1,560,983 | Gibbs et al. | Nov. 10, 1925 |
| 1,658,500 | Tewes | Feb. 7, 1928 |
| 1,735,404 | Masury | Nov. 12, 1929 |
| 1,939,863 | Seiter | Dec. 19, 1933 |
| 1,946,497 | Little | Feb. 13, 1934 |
| 2,026,057 | Pearse et al. | Dec. 31, 1935 |
| 2,171,889 | Payson | Sept. 5, 1939 |
| 2,294,110 | Donaldson | Aug. 25, 1942 |